United States Patent [19]
Yamabuchi et al.

[11] Patent Number: 5,361,180
[45] Date of Patent: Nov. 1, 1994

[54] SIMPLIFIED CASSETTE LOADING MECHANISM FOR A MAGNETIC RECORDING AND REPRODUCING APPARATUS

[75] Inventors: Koji Yamabuchi; Hideshi Ohtsuka; Takashi Koyama, all of Nara; Yoshiyuki Yokomachi, Mie; Kazutaka Abe, Nara; Akio Tanaka, Tochigi, all of Japan

[73] Assignee: Sharp Kabushiki Kaisha, Osaka, Japan

[21] Appl. No.: 846,197

[22] Filed: Mar. 5, 1992

[30] Foreign Application Priority Data

Mar. 14, 1991 [JP] Japan ................... 3-049320
Nov. 26, 1991 [JP] Japan ................... 3-310834

[51] Int. Cl.[5] ............... G11B 15/665; G11B 15/61
[52] U.S. Cl. ................................. 360/85; 360/95; 360/96.5
[58] Field of Search ................. 360/85, 95, 96.5

[56] References Cited

U.S. PATENT DOCUMENTS

| | | | |
|---|---|---|---|
| 4,789,912 | 12/1988 | Masuda et al. | 360/85 |
| 4,796,115 | 1/1989 | Ohshima et al. | 360/85 |
| 4,803,574 | 2/1989 | Konishi et al. | 360/85 |
| 4,807,077 | 2/1989 | Zaitsu et al. | 360/95 |
| 4,956,732 | 9/1990 | Moriyama | 360/85 |
| 4,985,789 | 1/1991 | Kodama et al. | 360/85 |
| 5,021,899 | 6/1991 | Kotoda | 360/95 |
| 5,077,624 | 12/1991 | Nakanishi | 360/95 |
| 5,081,549 | 1/1992 | Doutsubo | 360/95 |
| 5,099,370 | 3/1992 | Kim | 360/95 |
| 5,124,854 | 6/1992 | Iyota et al. | 360/96.5 |
| 5,151,832 | 9/1992 | Nagasawa | 360/95 |

FOREIGN PATENT DOCUMENTS

| | | |
|---|---|---|
| 0204487 | 10/1986 | European Pat. Off. |
| 0232161 | 8/1987 | European Pat. Off. |
| 0310114 | 4/1989 | European Pat. Off. |
| 0442525 | 8/1991 | European Pat. Off. |
| 0449658 | 10/1991 | European Pat. Off. |
| 3701159 | 1/1987 | Germany |
| 61-271651 | 12/1986 | Japan |
| 0263661 | 10/1988 | Japan ................. 360/96.5 |
| 2-64956 | 3/1990 | Japan |
| 2-103765 | 4/1990 | Japan |
| 8403790 | 3/1984 | WIPO |

OTHER PUBLICATIONS

Patent Abstracts of Japan, JP 62271243, Magnetic Recording and Reproducing Device, Hideyuki et al, publication date Dec. 5, 1988.

Primary Examiner—A. J. Heinz
Assistant Examiner—Brian E. Miller
Attorney, Agent, or Firm—Nixon & Vanderhye

[57] ABSTRACT

A loading lever having loading lever pins is fixed on a main chassis. Loading arms having loading arm depressed portions are rotatably attached to a slide chassis. The loading arm depressed portion engages with the loading lever pin, and the loading arm depressed portion is engaged with the loading lever pin, and in this state, the slide chassis moves in the direction of the arrow B. Therefore, loading arms move in the direction of the arrows J and K. Since the loading arms are rotated, it becomes unnecessary to slide the loading lever, and therefore, the structure of the magnetic recording reproducing apparatus can be made simple.

15 Claims, 20 Drawing Sheets

SIMPLIFIED CASSETTE LOADING MECHANISM FOR A MAGNETIC RECORDING AND REPRODUCING APPARATUS

BACKGROUND OF THE INVENTION

1. Field of the Invention

The present invention relates to a magnetic recording reproducing apparatus and, more specifically, to a magnetic recording reproducing apparatus carrying out recording/reproducing by drawing a magnetic tape wound around a reel.

2. Description of the Background Art

FIG. 21 is a plan view of a slide chassis of a conventional magnetic recording reproducing apparatus. The magnetic recording reproducing apparatus is used in a camcorder, that is, a small portable video tape recorder and camera or the like.

Loading arms 3a and 3b are attached on a rear side of a slide chassis 1 rotatable around rotation shafts 5a and 5b, respectively. Parts such as linking arms, guide base and so on connected to the loading arms are not shown.

Slide chassis 1 includes slide chassis guiding grooves 43a, 43b, 43c and 43d. Guide pins provided on a main chassis 51, which will be described later, are fitted in slide chassis guiding grooves 43a, 43b, 43c and 43d, which allow slide chassis 1 to slide in the directions of the arrows A and B. A spring hook 41 is fixed on slide chassis 1.

FIG. 22 is a plan view of a main chassis of a conventional magnetic recording reproducing apparatus.

On main chassis 51, a loading motor 93, mid gears 96a–96e and a main cam 53 are rotatably provided. The reference numeral 55 denotes a rotation shaft of main cam 53. Driving force of loading motor 93 is transmitted through mid gears 96a–96e to main cam 53.

On main chassis 51, a lever 59 for driving the slide chassis is provided rotatable about a rotation shaft 61. A lever 59 for driving the slide chassis is arranged on main cam 53, and a cam pin 63 provided at lever 59 for driving the slide chassis is fitted in a groove 57 for driving the slide chassis provided at main cam 53.

A pin 65 for driving the slide chassis provided at the lever 59 for driving the slide chassis is fitted in a groove portion 56 provided the spring hook 41 on slide chassis 1 (see FIG. 21). By the rotation of main cam 53, cam pin 63 drives lever 59 for driving the slide chassis in the directions of the arrows C and D, so that slide chassis 1 slides in the directions of the arrows A and B (see FIG. 21).

A loading lever 101 is arranged on main chassis 51. By fitting a guide pin 52 on main chassis 51 in a loading lever guiding groove 50 provided at loading lever 101, loading lever 101 is made slidable in the directions of the arrows A and B. A cam pin 66 provided at loading lever 101 is fitted in a groove 60 for driving the loading lever provided at main cam 53. Namely, by the rotation of main cam 53, loading lever 101 slides in the directions of the arrows A and B.

A lever 71 for bringing a pinch roller into tight contact is rotatably attached on main chassis 51. The pinch roller is driven by utilizing the rotation of the lever 71 for bringing the pinch into tight contact. A cam 70 for bringing the pinch roller into tight contact, and mid gears 78a and 78b are provided rotatable on main chassis 51. Rotation of main cam 53 is transmitted through mid gears 78b, 78a and the cam 70 to the lever 71, and hence the lever 71 rotates. In the figure, the reference numeral 77 denotes a drum. By rotating the loading arms 3a and 3b, a guide roller (not shown) connected to loading arms 3a and 3b takes up a magnetic tape (not shown), bring the tape into tight contact with the drum 77, and allows recording/reproducing on the magnetic tape. The operation of rotation of the loading arms 3a and 3b in a conventional magnetic recording apparatus will be described with reference to FIGS. 23–25.

FIG. 23 shows a state of ejection. In the state of ejection, end portions 92a and 92b (see FIG. 21) of loading arms 3a and 3b are in contact with loading arm bending portions 107a and 107b provided at the loading lever 101, so that loading lever 101 is bent inward. Since end portions 92a and 92b are formed of resilient material, there is generated a force to stretch, so that forces in the directions of H and I are applied to loading arms 3a and 3b, respectively.

When loading motor 93 rotates at this state, lever 59 for driving the slide chassis begins to rotate in the direction of the arrow D. Thus, slide chassis 1 moves in the direction of the arrow B.

When slide chassis 1 further slides in the direction of the arrow B, end portions 92a and 92b are separated from loading lever bending portions 107a and 107b, and thereafter, loading arm depressed portions 109a and 109b (see FIG. 21) provided at loading arms 3a and 3b engage with loading lever pins 111a and 111b provided at loading lever 101, and thus sliding of slide chassis 1 is completed as shown in FIG. 24.

After the end of the movement of slide chassis 1, main cam 53 further rotates, and the groove 60 for driving the loading lever depresses the cam pin 66. Thus loading lever 101 starts to move in the direction of the arrow A. Since loading arm depressed portion 109a is in contact with loading lever pin 111a and loading arm depressed portion 109b is in contact with loading lever pin 111b, loading arms 3a and 3b start to rotate in the directions of the arrows J and K around rotation shafts 5a and 5b, respectively, when loading lever 101 starts to move in the direction of the arrow A. FIG. 25 shows the state after the end of rotation of loading arms 3a and 3b. When loading arms 3a and 3b reach the state of FIG. 25, the operation of the guide roller (not shown) connected to the loading arms 3a and 3b to bring the magnetic tape (not shown) onto the drum 77 is completed.

As shown in FIG. 24, in the conventional magnetic recording reproducing apparatus, loading arms 3a, 3b are rotated by moving the loading lever 101 in the direction of the arrow A. Therefore, in the conventional recording reproducing apparatus, loading lever 101 as well as slide chassis 1 must be moved, which results in the complicated structure.

SUMMARY OF THE INVENTION

An object of the present invention is to provide a magnetic recording reproducing apparatus having a simple structure.

Another object of the present invention is to provide a magnetic recording reproducing apparatus having a structure preventing the guide base from getting off from the guide rail.

A further object of the present invention is to provide a magnetic recording reproducing apparatus having a structure ensuring positioning of a guide base at the end of loading.

The magnetic recording reproducing apparatus in accordance with the present invention includes a first chassis having a rotary head drum; a second chassis arranged movable with respect to the first chassis between a position for taking out the cassette and a position for recording and reproducing, with the cassette mounted thereon; a tape taking up arm provided rotatable on the second chassis; and a tape taking out lever fixed on the first chassis which can be brought into contact with the tape take up arm during the movement of the second chassis. The tape taking up arm and the tape taking up lever are provided on the second chassis and the first chassis, respectively, such that the tape taking up arm and the tape taking up lever are brought into contact during movement of the second chassis, and as the second chassis moves with the arm and the lever being in contact with each other, the tape taking up arm rotates to take up the magnetic tape and winds the tape around the rotary head drum.

In the present invention, the tape taking up arm is rotated by using the force of movement of the second chassis. Therefore, it is not necessary to slide the tape taking up lever.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

One embodiment of the magnetic recording reproducing apparatus in accordance with the present invention will be described in the following.

Figure 2:
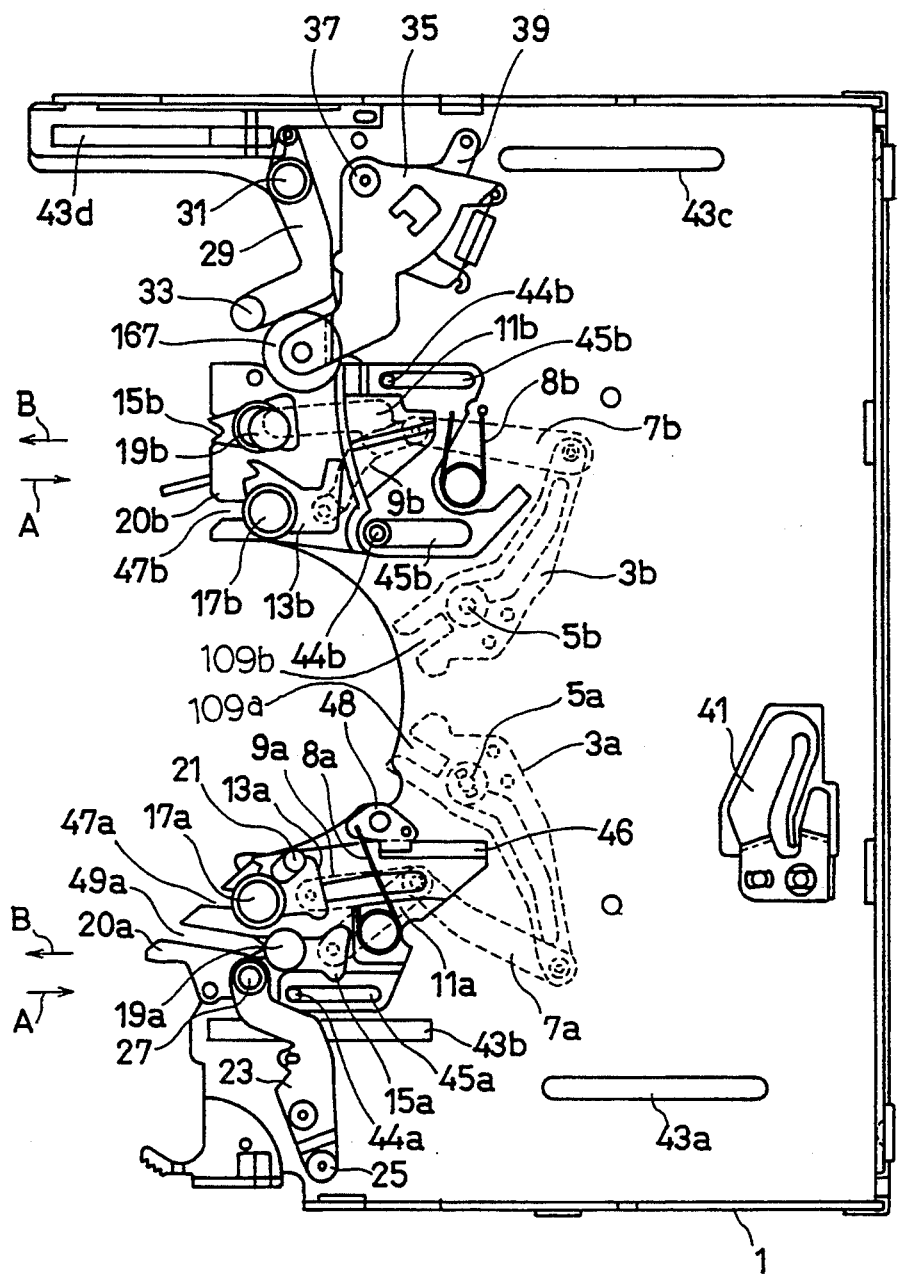
FIG. 2 is a plan view of a slide chassis in accordance with one embodiment of the magnetic recording reproducing apparatus of the present invention.

FIG. 2 is a plan view of a slide chassis in accordance with the present invention.

Loading arms 3a and 3b as an example of a tape taking up arm are provided rotatable around rotation shafts 5a and 5b on the rear side of slide chassis 1 as an example of a second chassis.

Figure 8:
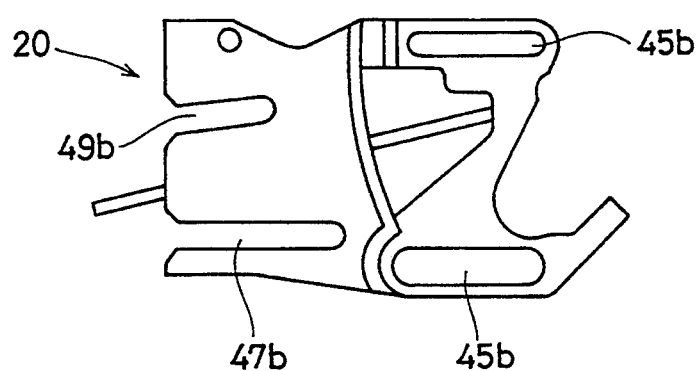
FIG. 8 is a plan view of a slide guide rail 20b provided in one embodiment of the magnetic recording reproducing apparatus in accordance with the present invention.
Figure 9:
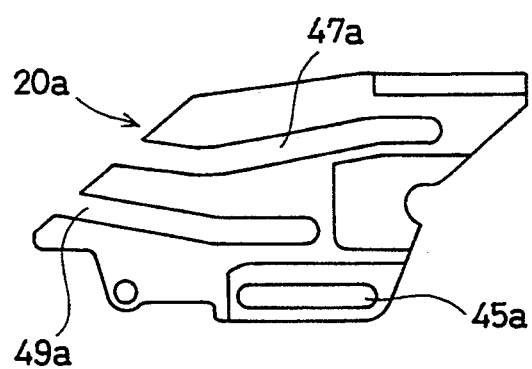
FIG. 9 is a plan view of a slide guide rail 20a provided in one embodiment of the magnetic recording reproducing apparatus in accordance with the present invention.

Slide guide rails 20a and 20b are provided slidable in the directions of the arrows A and B on slide chassis 1. FIG. 8 is a plan view of slide guide rail 20b, and FIG. 9 is a plan view of slide guide rail 20a.

A guide pin 44a provided at slide chassis 1 is fitted in a slide guide rail guiding groove 45a provided at the slide guide rail 20a. A guiding piece 48 provided at slide chassis 1 is positioned on a guiding portion 46 on the slide guide rail 20a. Such structure enables sliding of the slide guide rail 20a.

A spring 8a for biasing the slide guide rail has one end attached to a guide piece 48, and the other end fitted to the slide guide rail 20a. The slide guide rail 20a is biased in the direction of the arrow B by the spring 8a.

A guide pin 44b provided at slide chassis 1 is fitted in a slide guide rail guiding groove 45b provided at slide guide rail 20b. Thus sliding of the slide guide rail 20b is enabled. A spring 8b for biasing the slide guide rail has one end attached to slide chassis 1, and the other end fitted to the slide guide rail 20b. The slide guide rail 20b is also biased in the direction of the arrow B by the spring 8b.

A third linking arm 7a is rotatably attached to one end of loading arm 3a, and a first linking arm 9a and a second linking arm 11a are rotatably attached to the third linking arm 7a. To the first linking arm 9a, a first guide base 13a slidably arranged in a first guide base guiding groove 47a provided on slide guide rail 20a, is attached. A first guide roller 17a and an inclined guide 21 are attached to the first guide base 13a.

To the second linking arm 11a, a second guide base 15a slidably arranged in a second guide base guiding groove 49a provided at slide guide rail 20a is attached. A second guide roller 19a is attached to the second guide base 15a.

The similar structure is provided on the side of the slide guide rail 20b. A third linking arm 7b corresponds to the third linking arm 7a, a first linking arm 9b corresponds to the first linking arm 9a, a second linking arm 11b corresponds to the second linking arm 11a, a first guide base 13b corresponds to the first guide base 13a, a second guide base 15b corresponds to the second guide base 15a, a first guide roller 17b corresponds to the first guide roller 17a, a second guide roller 19b corresponds to the second guide roller 19a, a first guide base guiding groove 47b corresponds to the first guide base guiding groove 47a, and a second guide base guiding groove 49b (see FIG. 8) corresponds to the second guide base guiding groove 49a.

Slide chassis guiding grooves 43a, 43b, 43c and 43d are provided on slide chassis 1. Guide pins attached to the main chassis 51, which will be described later, are fitted in slide chassis guiding grooves 43a, 43b, 43c and 43d, allowing sliding of the slide chassis 1 in the directions of the arrows A and B.

A tension arm 23 is attached to slide chassis 1 rotatable around a rotation shaft 25. A guide 27 is attached to tension arm 23. A take up guide arm 29 is also attached to slide chassis 1 rotatable around a rotation shaft 31. A take up guide 33 is attached to take up guide arm 29.

Further, a sub pinch arm 39 is attached to slide chassis 1 rotatable around rotation shafts 37 which shaft is provided at slide chassis 1. A pinch arm 35 is attached rotatable around the rotation shaft 37 on sub pinch arm 39. A pinch roller 167 is attached to pinch arm 35.

Figure 3:
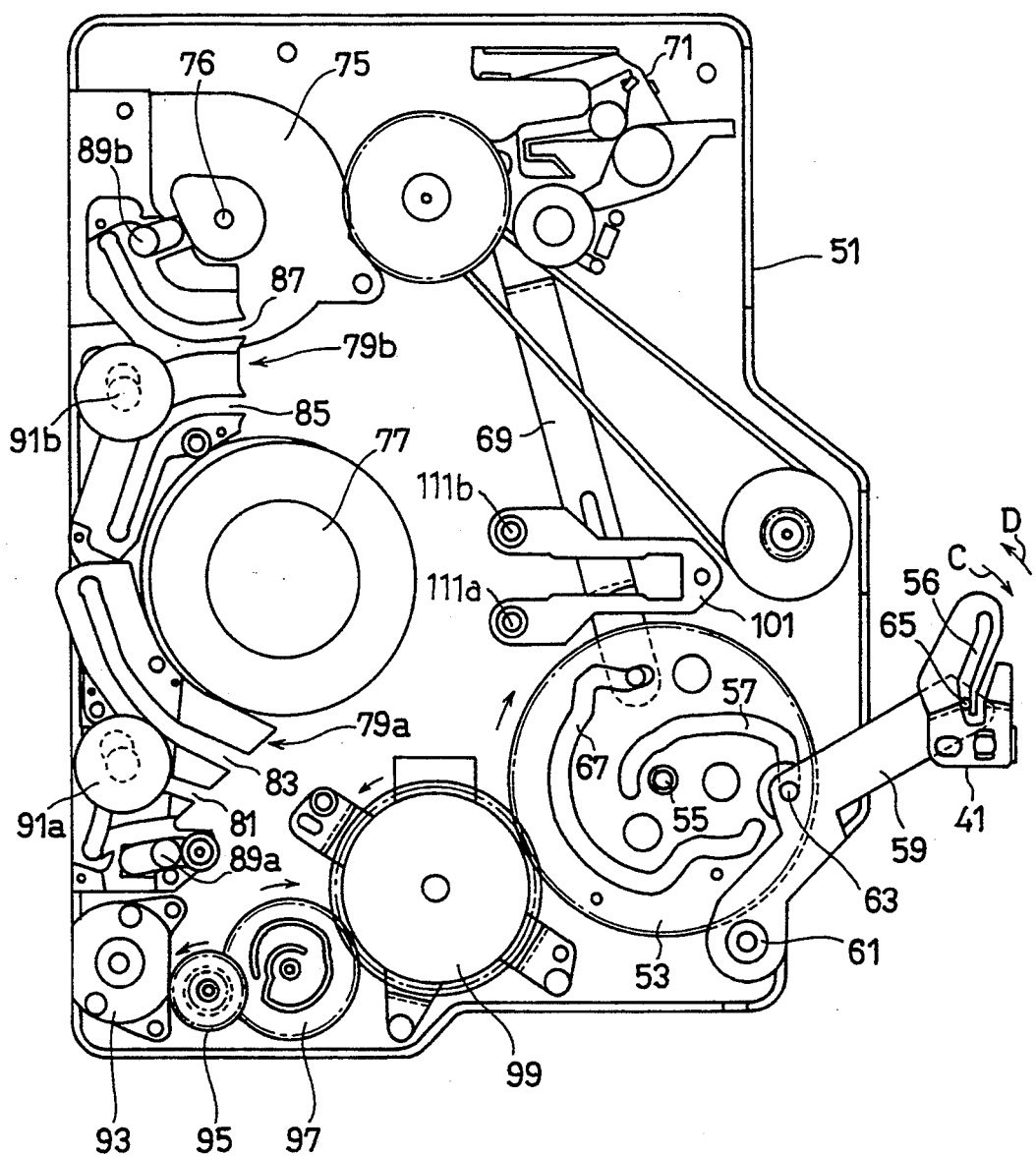
FIG. 3 is a plan view of a main chassis in accordance with one embodiment of the magnetic recording reproducing apparatus in accordance with the present invention.

FIG. 3 is a plan view of a main chassis 51 of one embodiment of the magnetic recording reproducing apparatus in accordance with the present invention. A loading motor 93, a loading gear 95, a tension cam 97, a mode detecting gear 99 and a main cam 53 are attached rotatable on the main chassis 51 as an example of a first chassis. The reference numeral 55 denotes a rotation shaft of the main cam 53. The driving force of loading motor 93 is transmitted through loading gear 95, tension cam 97 and mode detecting gear 99 to main cam 53.

A lever 59 for driving the slide chassis is attached rotatable about a rotation shaft 61 on main chassis 51. The lever 59 for driving the slide chassis is arranged on the main cam 53, and a cam pin 63 of the lever 59 for driving the slide chassis is fitted in the groove 57 for driving the slide chassis formed at the main cam 53.

A pin 65 for driving the slide chassis formed on the lever 59 for driving the slide chassis is fitted in a groove portion 56 of a spring hook 41 on slide chassis 1. By the rotation of the main cam 53, cam pin 63 moves the lever 59 for driving the slide chassis in the directions of the arrows C and D, and thus the slide chassis 1 (see FIG. 2) slides in the directions of the arrows A and B.

A drum 77 is provided on main chassis 51. A first guide rail 79a and a second guide rail 79b are arranged on both sides of the drum 77. The first guide rail 79a has guide base guiding grooves 81 and 83. The second guide rail 79b has guide base guiding grooves 85 and 87.

Guide base guiding groove 81 is connected to second guide base guiding groove 49a (see FIG. 2), guide base guiding groove 83 is connected to the first guide base guiding groove 47a (see FIG. 2), guide base guiding groove 85 is connected to the first guide base guiding groove 47b (see FIG. 2) and guide base guiding groove 87 is connected to the second guide base guiding groove 49b (see FIG. 8).

There is a capstan motor 75 having a capstan 76 as a shaft is provided near the second guide rail 79b. The reference character 89a denotes a first inclined guide, and 89b denotes a second inclined guide. 91a denotes a first impedance roller, and 91b denotes a second impedance roller.

The reference numeral 69 denotes a pinch operating lever, and 71 is a lever for bringing the pinch into tight contact. The reference numeral 101 denotes a loading lever as an example of a tape taking up lever, which is related to driving of loading arms 3a and 3b (see FIG. 2). The details of the loading lever 101 will be described later.

The loading operation, that is, the operation of the first guide bases 13a and 13b and the second guide bases 15a and 15b shown in FIG. 2 will be described with reference to FIGS. 4–7.

Figure 4:
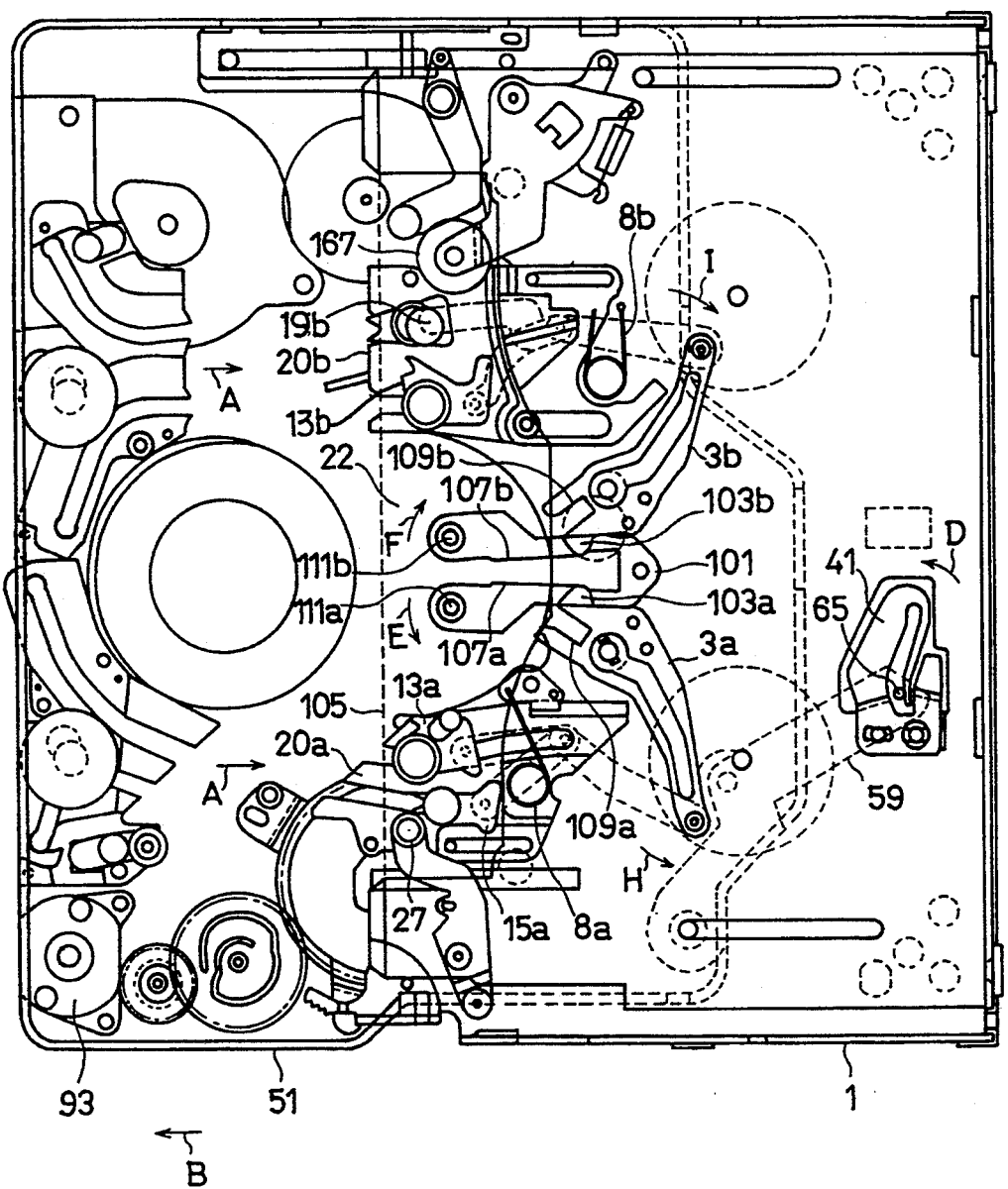
FIG. 4 is a plan view showing operations of the first guide base and a second guide base provided in one embodiment of the magnetic recording reproducing apparatus of the present invention.

FIG. 4 shows a state of ejection. A cassette 113 (see FIG. 1) is mounted on a slide chassis 1. At this state, a group of guides (guide 27 and so on) in contact with the non-magnetic side of the tape 105 and pinch roller 167 are contained in a cassette mouth 22, and cassette 113 is attached or detached in this state.

In the ejected state, arm projecting portions 103a and 103b of loading arms 3a and 3b abut loading lever bending portions 107a and 107b of loading lever 101 so that it is bent inward. Since loading lever 101 is formed of a resilient material, there is generated a force to stretch, and, consequently, forces in the directions of the arrows E and F are generated at loading lever 101. By the force in the direction of E, a force in the direction of H acts on loading arm 3a. A force in the direction of I is applied to loading arm 3b by the force direction of the arrow F.

By the loading arm 3a receiving the force in the direction of H, the first guide base 13a and the second guide base 15a are drawn to the direction of the arrow A. The first guide base 13a and the second guide base 15a press the slide guide rail 20a in the direction of A when they slide in the direction of the arrow A. Consequently, slide guide rail 20a slides in the direction of A against the spring 8a biasing the slide guide rail, and stops at a prescribed position.

Loading arm 3b receives the force in the direction of I as in the case of loading arm 3a, and draws the first guide base 13b and the second guide base 15b in the direction of A. The first guide base 13b and the second guide base 15b press the slide guide rail 20b in the direction of A when they slide in the direction of A. Consequently, slide guide rail 20b also slides in the direction of A against the spring 8b biasing the slide guide rail, and stops at a prescribed position.

When loading motor 93 rotates at this state, the lever 59 for driving the slide chassis starts to rotate in the direction of the arrow D. Consequently, slide chassis 1 starts to move in the direction of the arrow B.

Figure 5:
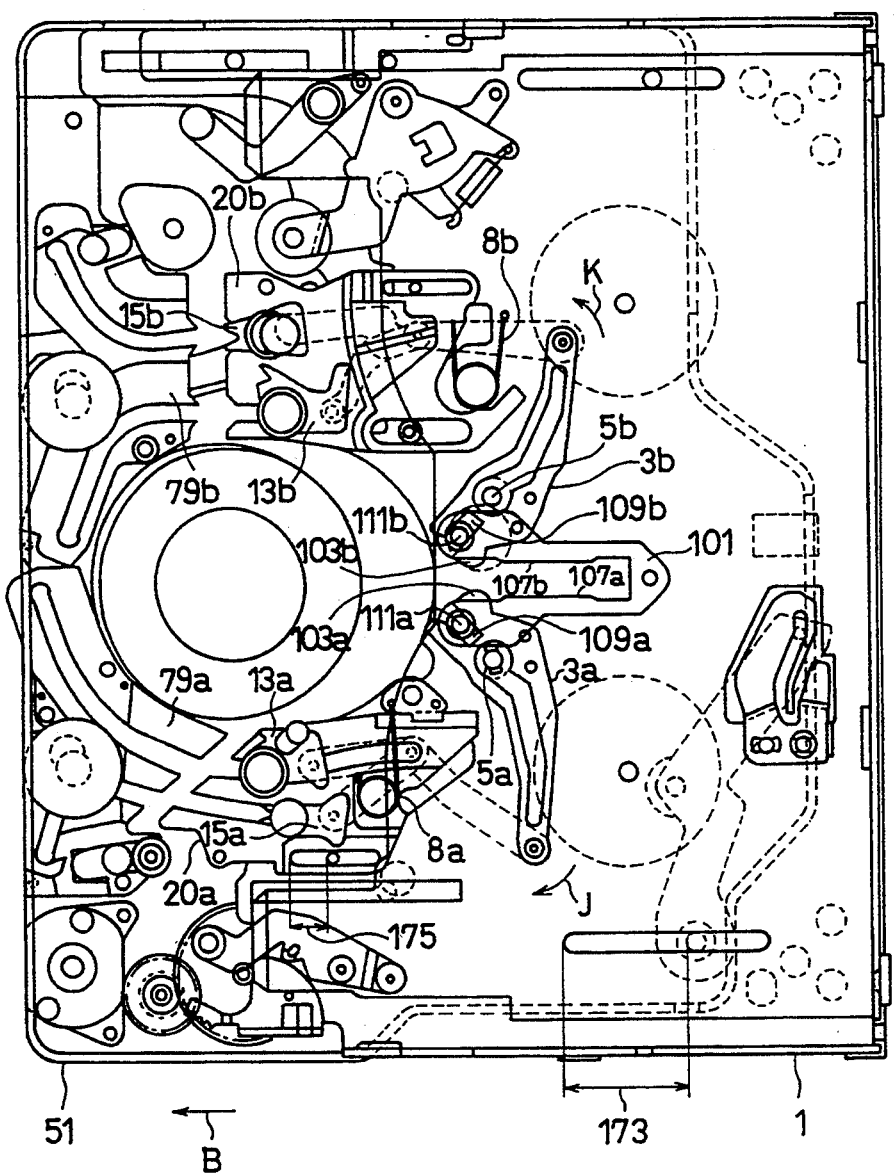
FIG. 5 is a plan view showing the operation of the first guide base and the second guide base provided in one embodiment of the magnetic recording reproducing apparatus of the present invention.

When the slide chassis 1 further slides in the direction of the arrow B, arm projecting portions 103a and 103b are separated from loading lever bending portions 107a and 107b as shown in FIG. 5, and then loading arm depressed portion 109a and 109b (see FIG. 2) of loading arms 3a and 3b are engaged with loading lever pins 111a and 111b of loading lever 101.

When the slide chassis 1 further slides in the direction of the arrow B, loading arms 3a and 3b start rotation in the directions of J and K, respectively. Thus the first guide bases 13a and 13b and the second guide bases 15a and 15b move in the direction of the arrow B.

Since the first guide bases 13a and 13b and the second guide bases 15a and 15b move in the direction of the arrow B, a force against the slide guide rail biasing springs 8a and 8b is eliminated, and the slide guide rails 20a and 20b move together with the first and second guide bases 13a, 13b, 15a and 15b in the direction of the arrow B by the forces of the springs 8a and 8b biasing the slide guide rail. The reference numeral 173 denotes the amount of movement of the slide chassis 1 from the ejected state. The reference numeral 175 denotes the amount of movement of the slide guide rail 20a.

Figure 6:
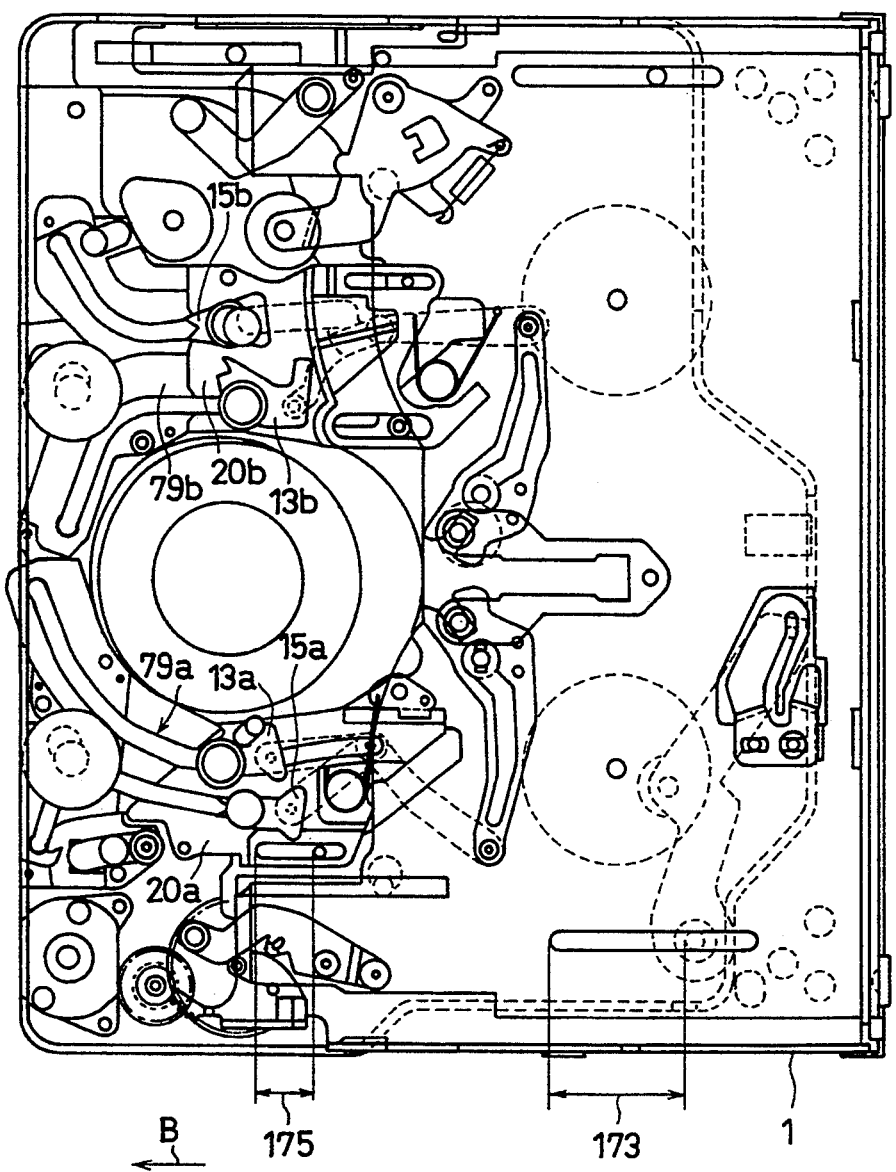
FIG. 6 is a plan view showing the operation of the first guide base and the second guide base provided in one embodiment of the magnetic recording reproducing apparatus of the present invention.

When the slide chassis 1 further slides in the direction of the arrow B, the slide guide rail 20a is connected to the first guide rail 79a and the slide guide rail 20b is connected to the second guide rail 79b, as shown in FIG. 6. It is adapted that the slide guide rail 20a is connected to the first guide rail 79a and the slide guide rail 20b is connected to the second guide rail 79b by the time the first and second guide bases 13a, 13b, 15a and 15b have passed the slide guide rails 20a and 20b.

When the slide chassis 1 further slides in the direction of the arrow B, the first guide bases 13a and 13b and the second guide bases 15a and 15b are guided by the first guide rail 79a and the second guide rail 79b.

Figure 7:
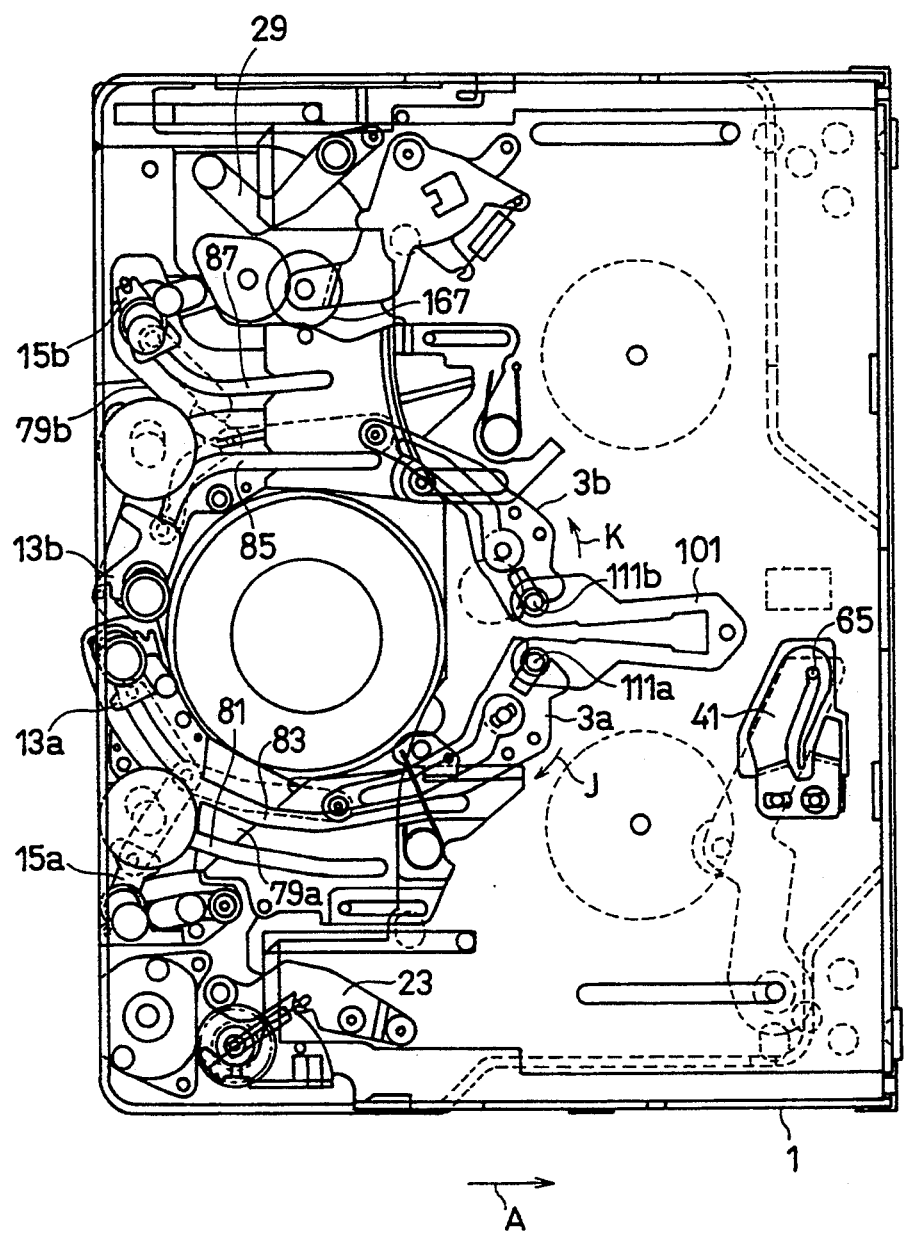
FIG. 7 is a plan view showing the operation of the first guide base and the second guide base provided in one embodiment of the magnetic recording reproducing apparatus of the present invention.

When the slide chassis 1 further slides in the direction of the arrow B, the first guide bases 13a and 13b and the second guide bases 15a and 15b are positioned by a catcher pin (not shown) before completion of sliding of the slide chassis 1, as shown in FIG. 7.

After the end of sliding of slide chassis 1, loading arms 3a and 3b receive the forces in the direction of the arrows J and K, since the loading lever 101 is bent, so that the first guide bases 13a and 13b and the second guide base 15a depress the catcher pin (not shown). Therefore, the guide bases are surely positioned.

As to unloading, since loading arm depressed portions 109a and 109b are engaged with loading lever pins 111a and 111b, unloading can be done simply by sliding the slide chassis 1 in the direction of the arrow A.

Since the spring hook 41 is resilient, even if the pin 65 for driving the slide chassis moves over the stroke of the slide chassis 1 at the time of unloading, the overstroke can be absorbed.

Figure 1:
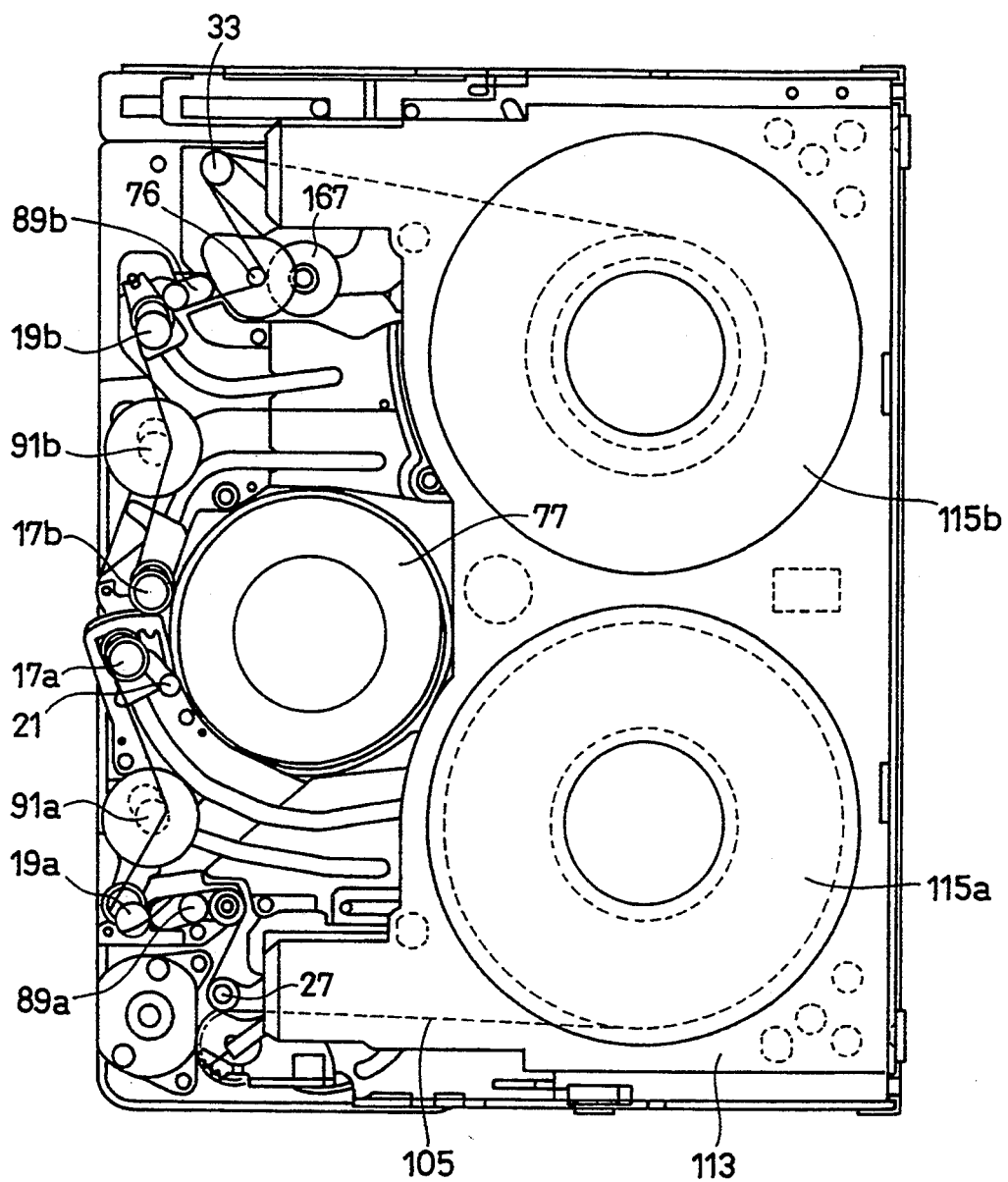
FIG. 1 is a plan view of a tape path in accordance with one embodiment of the magnetic recording reproducing apparatus of the present invention.

A tape path in accordance with the present embodiment will be described with reference to FIG. 1. A tape going out from a supply reel 115a of cassette 113 passes through guide 27 and the first inclined guide 89a where travelling plane is inclined, passes through the second guide roller 19a, the first impedance roller 91a, the first guide roller 17a and the inclined guide 21, and wound around the drum 77. The tape recorded or reproduced by the drum 77 passes through the first guide roller 17b, the second impedance roller 91b, the second guide roller 19b and the second inclined guide 89b where the travelling plane is returned, pinched by the capstan 76 and the pinch roller 167 and travels at a constant speed.

Further, the tape 105 passes through guide 33 and taken up by the take up reel 115b.

A mechanism for preventing the guide base from going out of place or from separation will be described. At the time of unloading, when the slide guide rail 20a is separated from the first guide rail 79a by some accident (for example, the first guide base 13a and the second guide base 15a are caught by the slide guide rail 20a) before the first guide base 13a and the second guide base 15a move from the first guide rail 79a to the slide guide rail 20a, then the first guide base 13a and the second guide base 15a drop off. The same applies to the first guide base 13b and the second guide base 15b on the take up side. The mechanism for preventing such separation will be described with reference to FIGS. 10 and 11.

Figure 10:
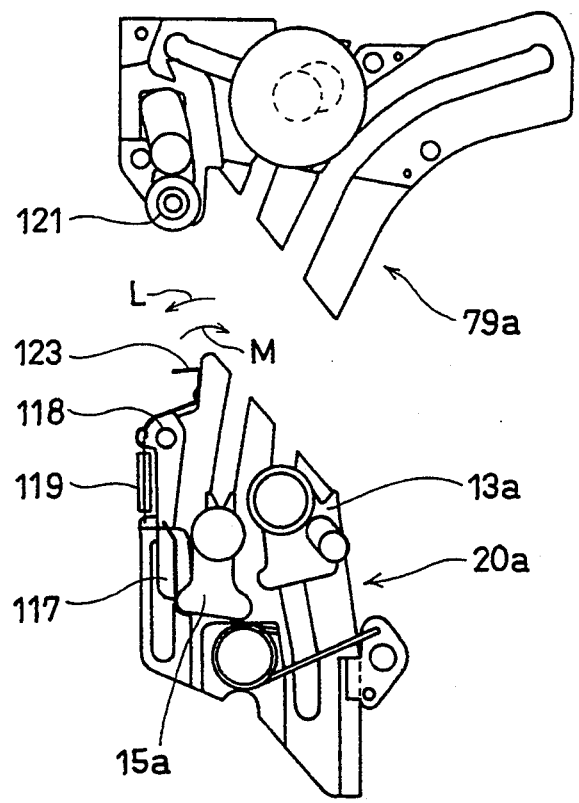
FIG. 10 is a plan view showing an example of a mechanism for preventing the guide base from getting out of place.

FIG. 10 shows the state of ejection, that is, the state where the slide guide rail 20a is apart from the first guide rail 79a. A hook lever 117 is attached rotatable about a shaft 118 on slide guide rail 20a. A hook lever spring 119 has one end attached to hook lever 117 and the other end attached to slide guide rail 20a. By the biasing force of the hook lever spring 119, the hook lever 117 receives a force in the direction of L. In the state of FIG. 10, the second guide base 15a depresses the hook lever 117 to the direction of M.

Figure 11:
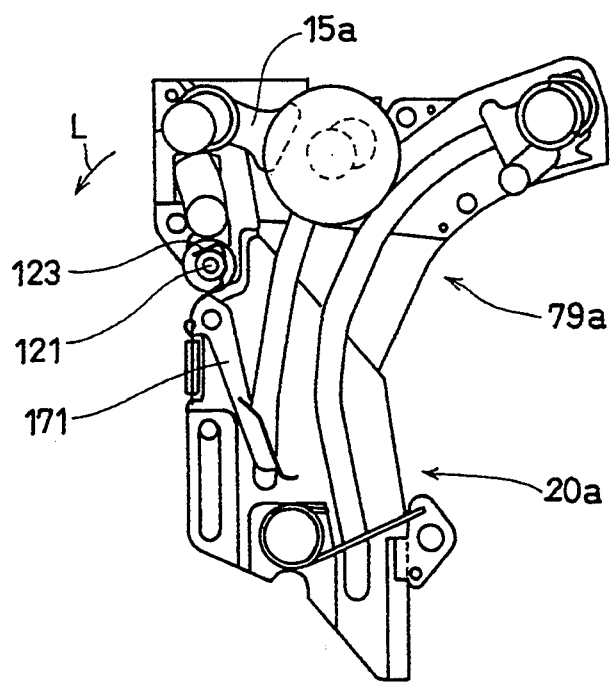
FIG. 11 is a plan view showing an example of a mechanism for preventing the guide base from getting out of place.

When the contact between the second guide base 15a and the hook lever 117 is released by loading, a force in the direction of the arrow L is applied to hook lever 117, so that a pawl portion 123 of hook lever 117 is caught in a rock pin 121 provided at the first guide rail 79a. This state is shown in FIG. 11. At the time of unloading, the connection between the slide guide rail 20a and the first guide rail 79a is kept until the second guide base 15a depresses the hook lever 117 so that the pawl portion 123 caught in rock pin 121 is released, and therefore the first guide base 13a and the second guide base 15a can be surely prevented from getting out of place. It is a matter of course that the same mechanism may be provided on the take up side, that is, on the first guide base 13b or the second guide base 15b.

Figure 12:
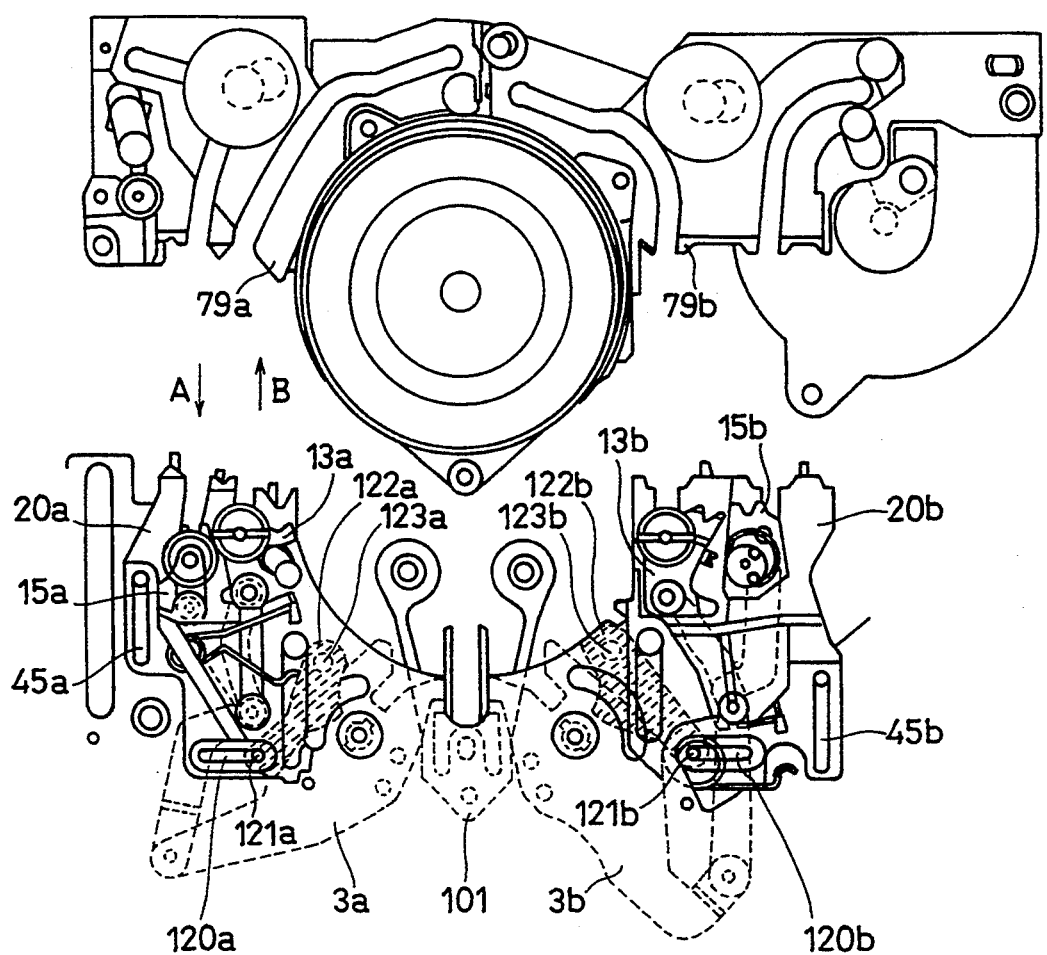
FIG. 12 is a plan view showing an example of the mechanism for preventing the guide base from getting out of place provided in one embodiment of the magnetic recording reproducing apparatus in accordance with the present invention.
Figure 13:
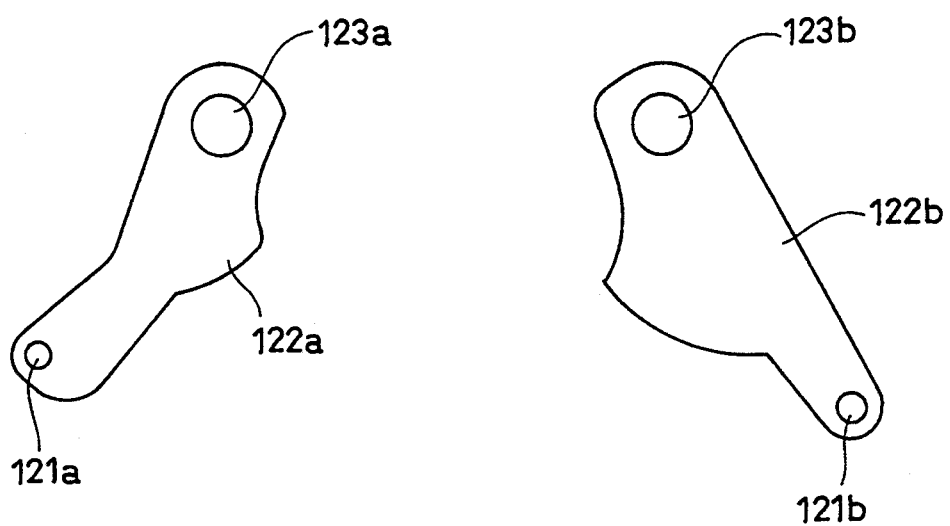
FIG. 13 is a plan view of a rock arm provided in one example of the mechanism for preventing the guide base from getting out of place.

Another example of the mechanism for preventing the guide base from getting out of place will be described with reference to FIGS. 12–16. FIG. 12 shows the state of ejection, that is, a state in which the slide guide rails 20a and 20b are off from the first guide rail 79a and the second guide rail 79b. A slip preventing groove 120a is formed in addition to the slide guide rail guiding groove 45a on slide guide rail 20a. A pin 121a formed on rock arm 122a is fitted to this groove. FIG. 13 is a plan view of the rock arm 122a. The reference numeral 122b denotes a rock arm on the take up side. The rock arm 122a is between the slide chassis and the loading arm 3a. Rock arm 122a rotates corresponding to the amount of movement of slide guide rail 20a, about fulcrum 123a provided below the slide chassis. A rock arm 122b on the take up side is formed in the same manner as the supply side. The reference character 120b denotes the groove for preventing slipping, 121b denotes a pin, and 123b denotes the fulcrum.

At the ejected state, the slide guide rails 20a and 20b are drawn in the direction of A by means of the first guide bases 13a and 13b, and the second guide bases 15a and 15b.

Figure 14:
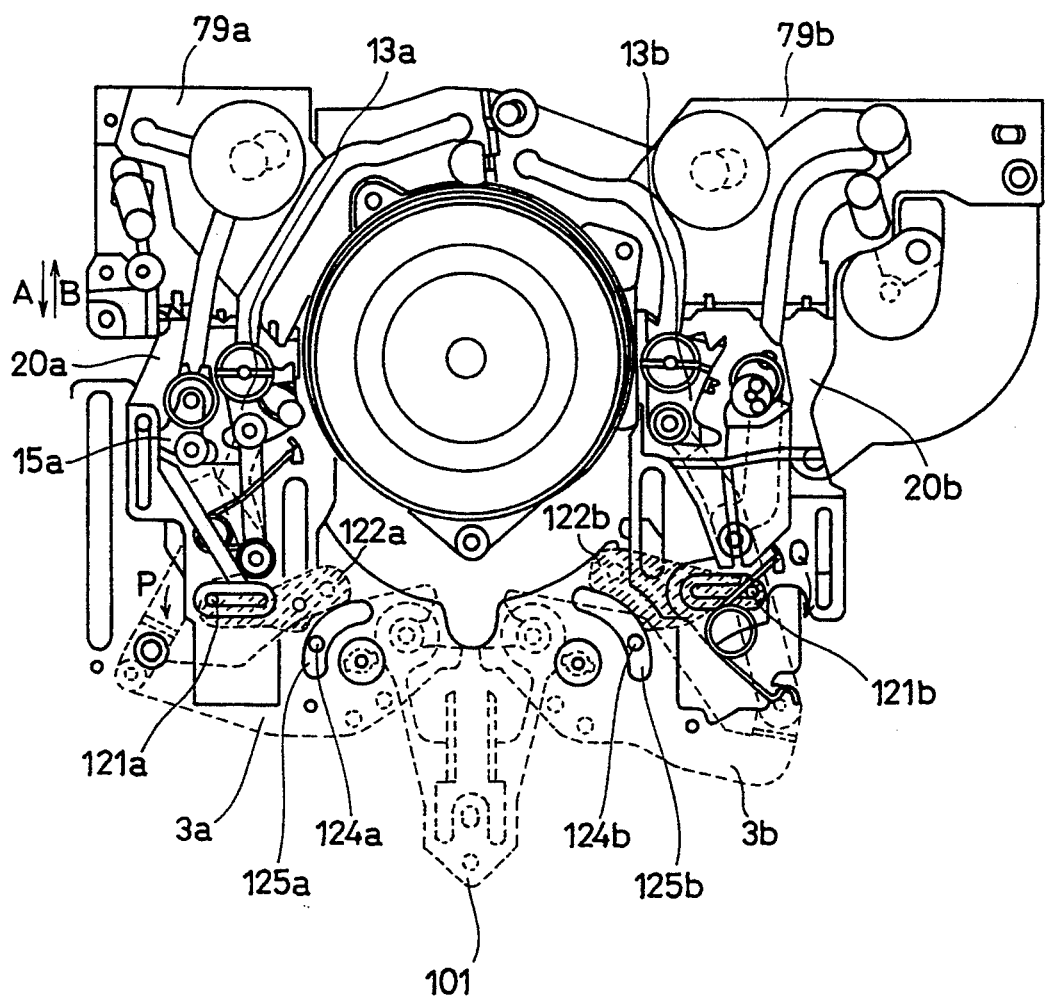
FIG. 14 is a plan view showing another example of the mechanism for preventing the guide base from getting out of place provided in one embodiment of the magnetic recording reproducing apparatus in accordance with the present invention.

When loading is started, the slide guide rails 20a and 20b slide in the direction of B as shown in FIG. 14 to be connected to the first guide rail 79a and second guide rail 79b. Rock pins 124a and 124b are formed on loading arms 3a and 3b. Loading arm 3a exists below the slide chassis. The rock pin 124a is projecting over slide chassis through a hole 125a formed at slide chassis. Similarly, a hole 125b is formed at the take up side.

In this state, rock arms 122a and 122b are not in contact with rock pins 124a and 124b, and therefore rock arms 122a and 122b can rotate in the directions of P and Q, respectively. Therefore, slide guide rails 20a and 20b can move in the direction of the arrow A.

Figure 15:
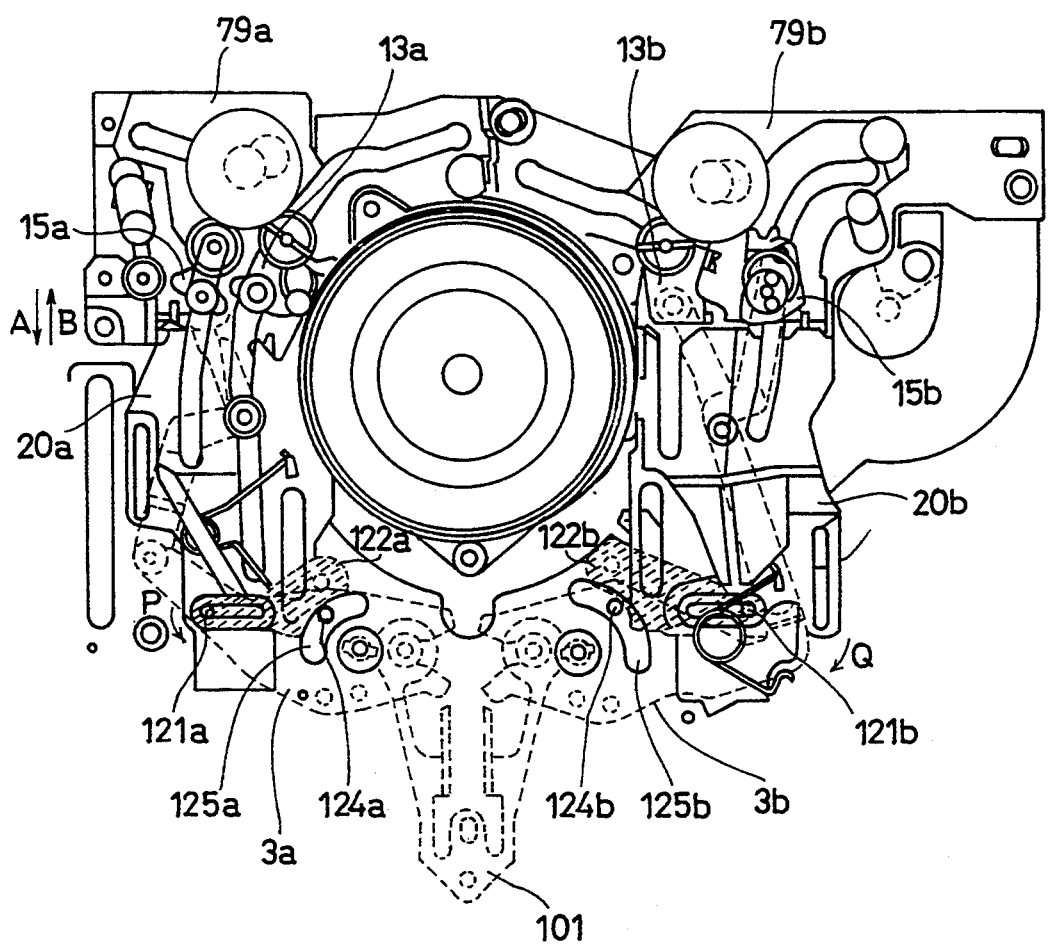
FIG. 15 is a plan view showing a further example of the mechanism for preventing the guide base from getting out of place provided in one embodiment of the magnetic recording reproducing apparatus in accordance with the present invention.
Figure 16:
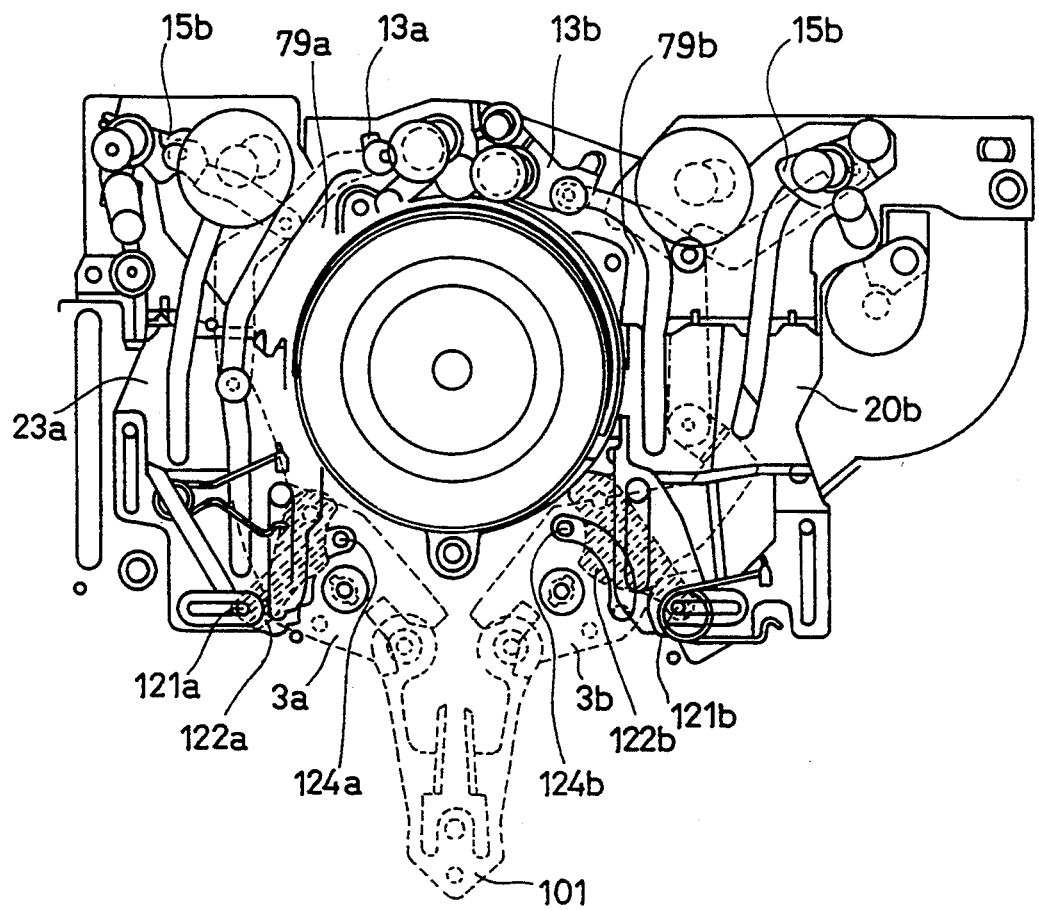
FIG. 16 is a plan view showing a further example of the mechanism for preventing the guide base from getting out of place provided in one embodiment of the magnetic recording reproducing apparatus in accordance with the present invention.

Loading is further proceeded and the first guide bases 13a and 13b and the second guide bases 15a and 15b start moving, as shown in FIG. 15. In this state, rotation of rock arms 122a and 122b in the directions of P and Q, respectively, is prevented since the rock arms 122a and 122b abut rock pins 124a and 124b. Since rock arms 122a and 122b cannot rotate in the directions of P and Q, slide guide rails 20a and 20b cannot move to the direction of A, and hence slide guide rails 20a and 20b are not separated from the first guide rail 79a and the second guide rail 79b, respectively. Therefore, even if the first guide bases 13a and 13b and the second guide bases 15a and 15b are caught in the slide guide rails 20a and 20b during unloading, the guide bases are not slipped off from the guiding grooves, since the slide guide rails 20a and 20b are connected to the first guide rail 79a and the second guide rail 79b. FIG. 16 shows the state when loading is completed. The rock arm has such a shape that the rock arm does not rotate in the direction of P or Q until the guide base is placed on the slide guide rail during unloading. More specifically, the rock arm is processed to have such a shape that the rock arm abuts the rock pin when the rock arm is about to rotate in the direction of P or Q.

Figure 17:
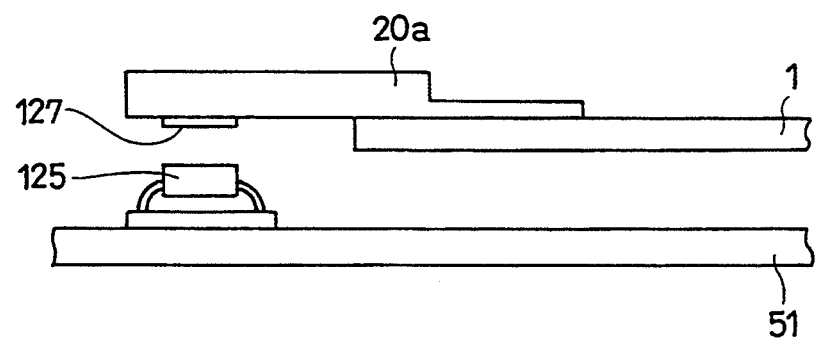
FIG. 17 is a schematic diagram showing a further example of the mechanism for preventing the guide base from getting out of place.

A further means for preventing slipping of the first guide base 13a and the second guide base 15a will be described with reference to FIG. 17. A reflective photointerrupter 125 is attached to the main chassis 51. A reflecting plate 127 such as a mirror is attached to slide guide rail 20a. The movement of slide guide rail 20a may be monitored by the reflective photointerrupter 125 so that the slide guide rail 20a is kept connected to the first guide rail 79a (not shown in FIG. 17) until the first guide base 13a and the second guide base 15a (not shown in FIG. 17) are moved to the slide guide rail 20a. Namely, when the slide guide rail 20a is separated from guide rail 79a before the guide bases 13a and 13b are moved onto the slide guide rail 20a, the loading motor 93 may be stopped or rotated in the reverse direction. A mode switch is used to detect whether or not the first guide base 13a and the second guide base 15a are on the slide guide rail 20a. If the first guide base 13a and the second guide base 13b are on the slide guide rail 20a, monitoring of the movement of the slide guide rail 20a by the reflective photointerrupter is released, enabling disconnection between the slide guide rail 20a and the first guide rail 79a.

As shown in FIG. 4, in one embodiment of the present invention, the first guide bases 13a, 13b and the second guide bases 15a and 15b depress the slide guide rails 20a and 20b in the direction of the arrow A at the time of ejection. However, the structure is not limited thereto, and any structure may be used if there is enough space.

As shown in FIG. 5, in one embodiment of the present invention, loading arm 3a and 3b are driven by the engagement of the loading arm depressed portions 109a, 109b and the loading lever pins 111a and 111b. However, it is not restrictive, and other mechanism such as rack may be used.

Figure 18:
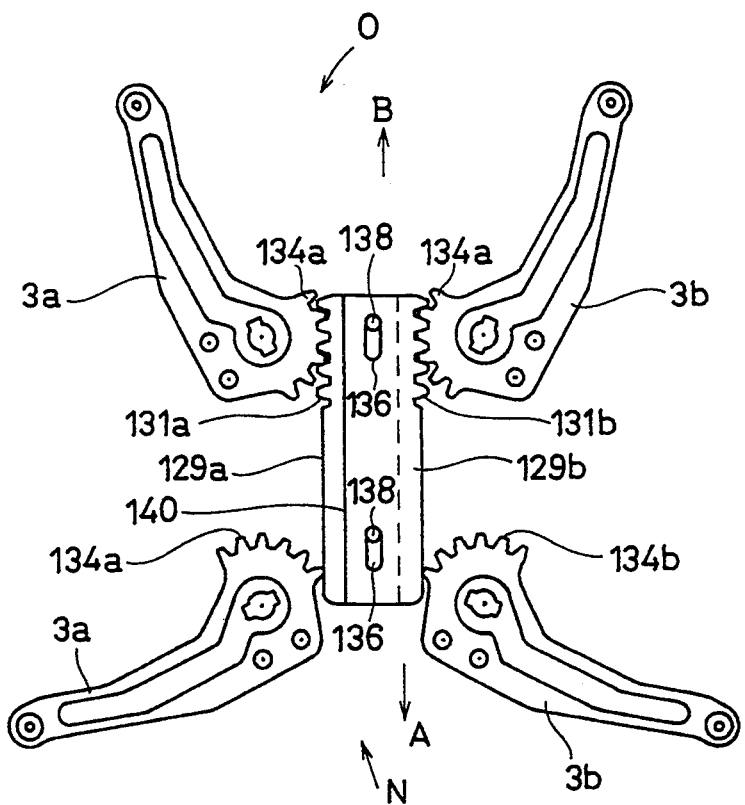
FIG. 18 is a plan view showing another example of a loading arm rotating mechanism provided in one embodiment of the magnetic recording reproducing apparatus in accordance with the present invention.

FIG. 18 shows a structure employing a rack. A stack of a loading plate 129a and a loading plate 129b is placed on a main chassis (not shown in FIG. 18). A loading plate guiding groove 136 is formed at loading plates 129a and 129b, and a guide pin 138 formed on main chassis is fitted to the loading plate guiding groove 136. Therefore, the stack of the loading plates 129a and 129b is slidable in the directions of the arrows A and B. The stack of the loading plates 129a and 129b is biased in the direction of the arrow A by some biasing means such as a spring, although not shown in FIG. 18. The loading plate 129 has a rack 131a, and the loading plate 129b has a rack 131a.

At the time of ejection, loading arms 3a and 3b are at the position denoted by N. When loading is started, loading arms 3a and 3b move, the rack 131a engages with a gear 134a, and rack 131b engages with gear 134b, so that loading arms 3a and 3b are brought to the state shown by O.

The loading plates 129a and 129b are biased by means of a spring or the like in the direction of the arrow A in order to absorb the overstroke by slightly moving the loading plates 129a and 129b in the direction of the arrow B.

Two loading plates are stacked in order to independently drive the loading arm 3a and the loading arm 3b so as to eliminate error between the loading plates 129a and 129b at the end of loading.

As shown in FIG. 7, in one embodiment of the present invention, the first guide bases 13a and 13b and the second guide bases 15a and 15b are surely positioned by the biasing force of the loading lever 101. For this purpose, loading lever pins 111a and 111b are attached to the loading lever 101. However, if a member (for example, third linking arms 7a and 7b) between the loading arms 3a and 3b and the first and second guide bases 13a, 13b, 15a and 15b has a structure generating biasing force at the completion of loading, the loading lever pins 111a and 111b may be directly attached to the main chassis 51.

Figure 19:
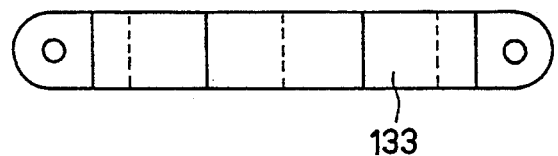
FIG. 19 is a plan view showing another example of a third linking arm provided in one embodiment of a magnetic recording reproducing apparatus of the present invention.
Figure 20:
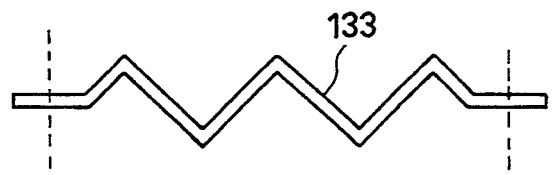
FIG. 20 is a side view of the third linking arm shown in FIG. 14.
Figure 21:
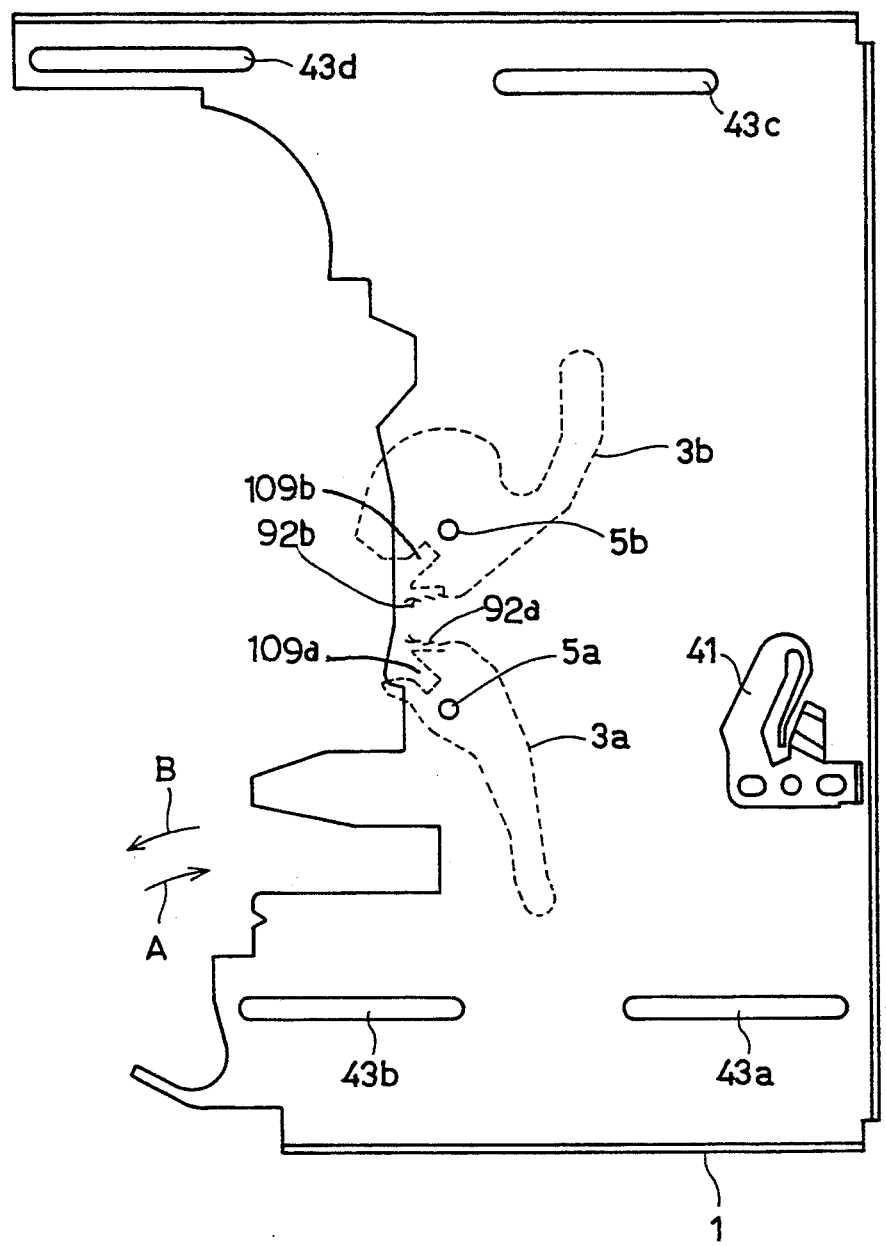
FIG. 21 is a plan view of a slide chassis in a conventional magnetic recording reproducing apparatus.
Figure 22:
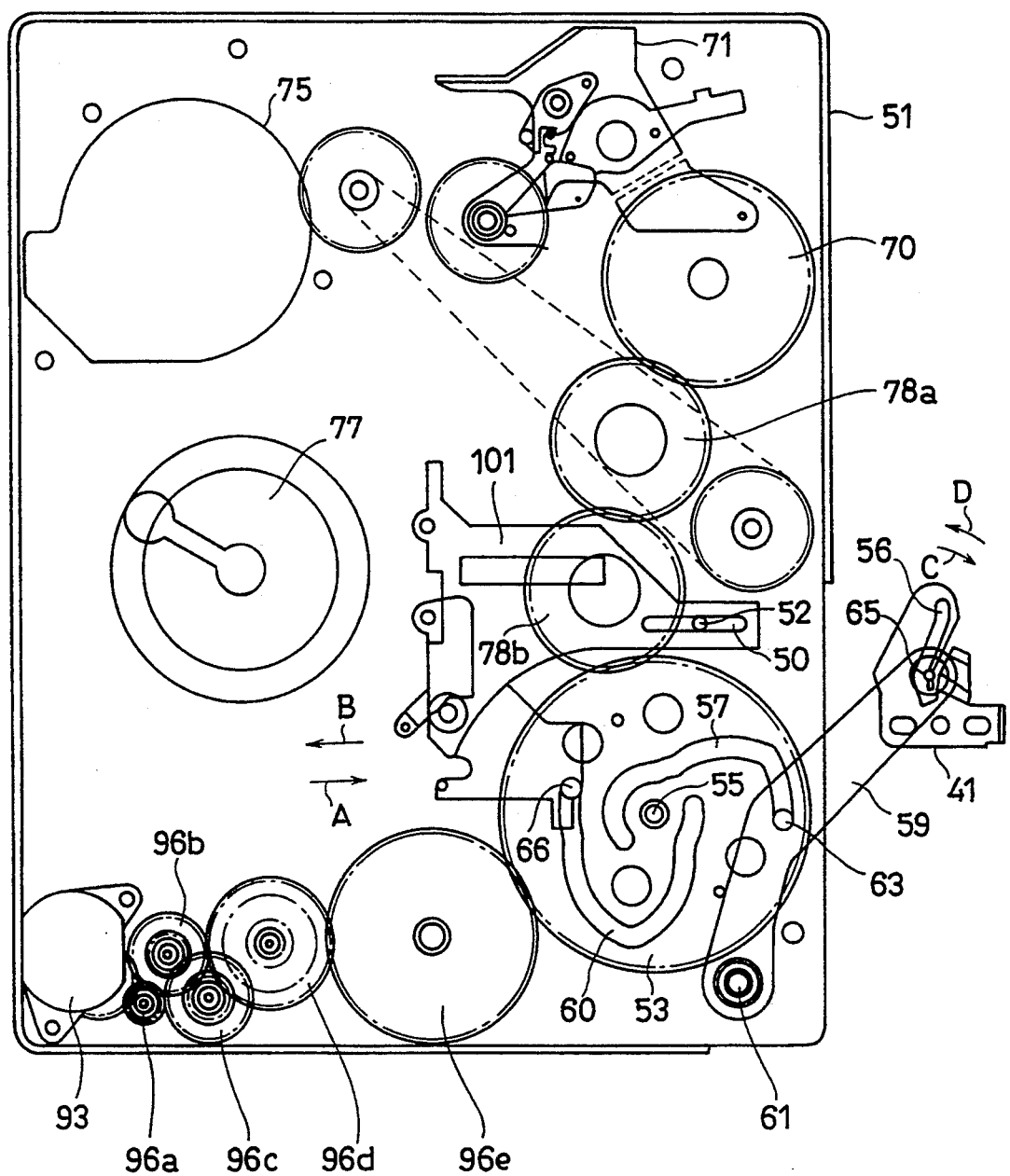
FIG. 22 is a plan view of a main chassis of a conventional magnetic recording reproducing apparatus.
Figure 23:
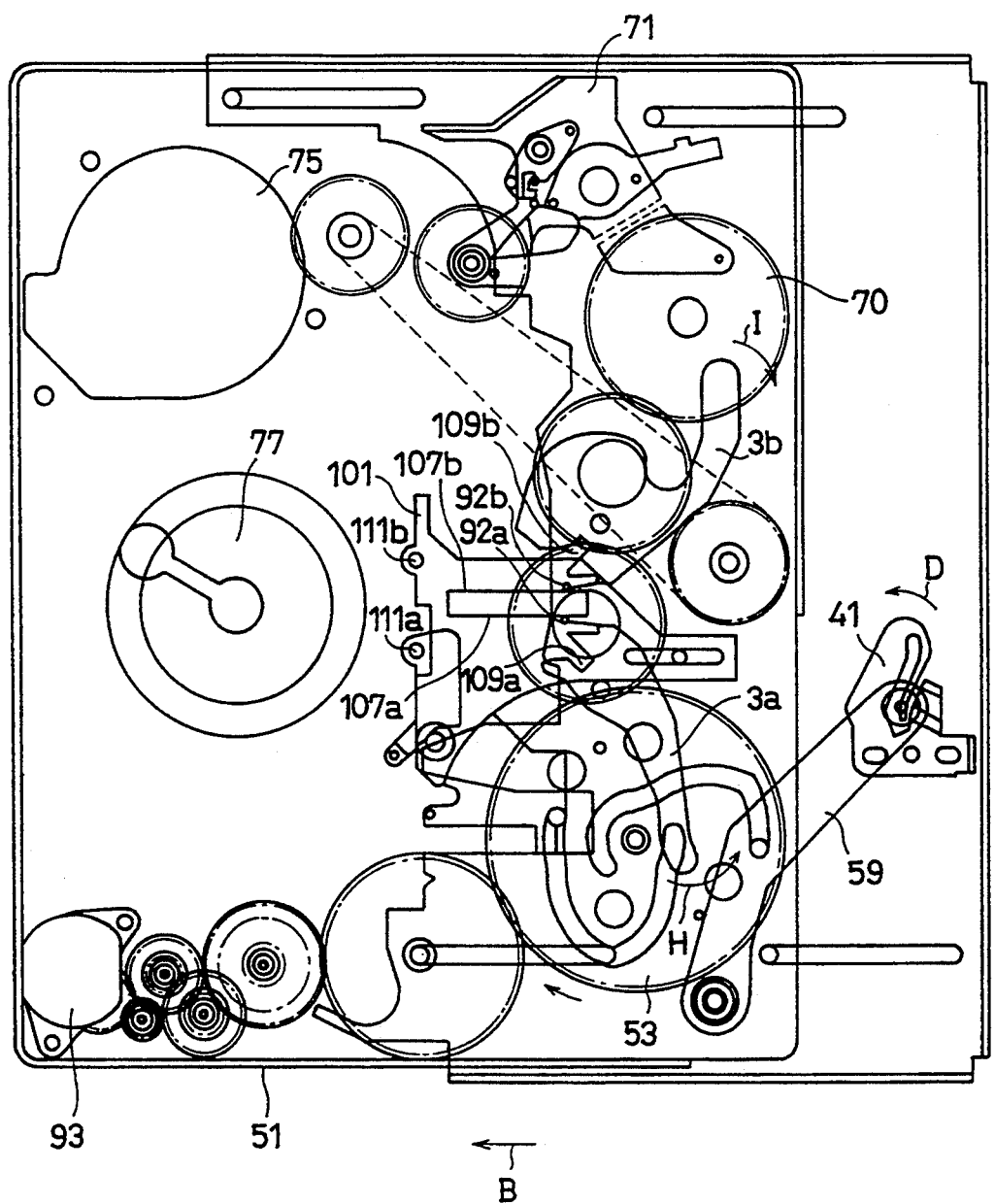
FIG. 23 is a plan view showing the operation of the loading arm provided in a conventional magnetic recording reproducing apparatus.
Figure 24:
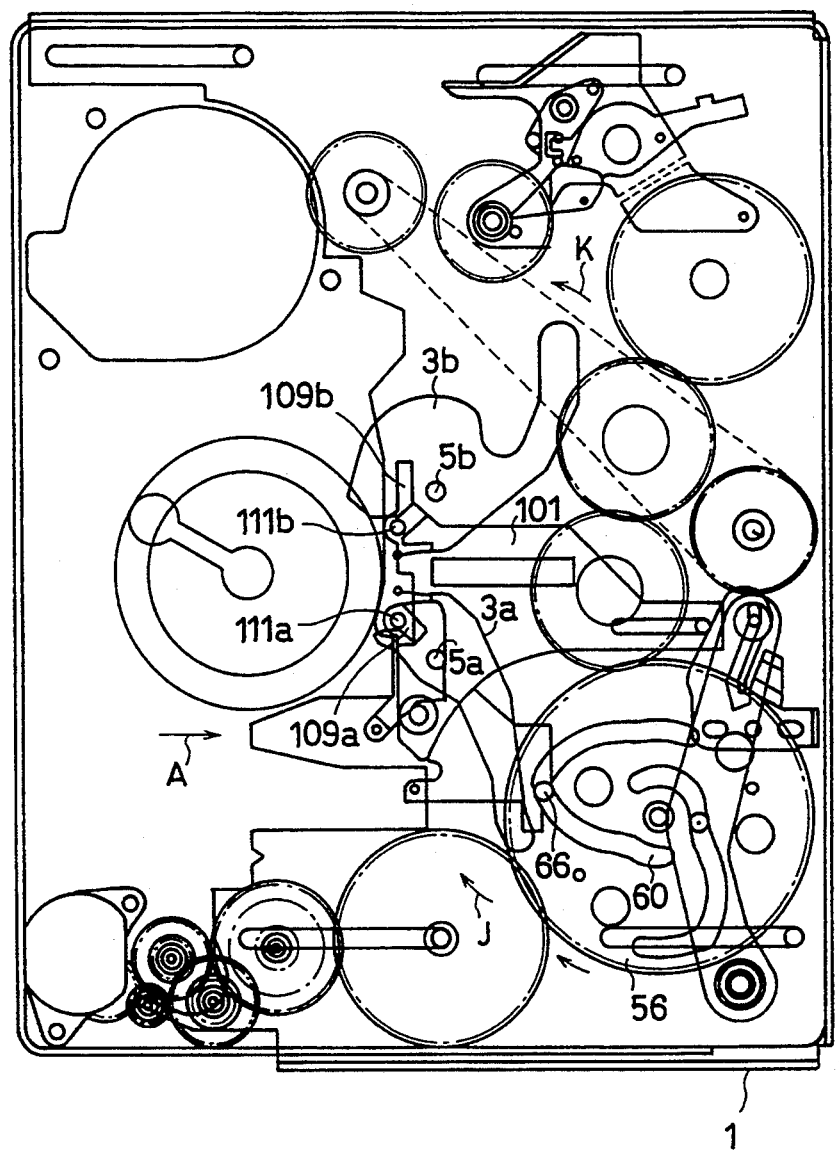
FIG. 24 is a plan view for explaining the rotation of the loading arm provided in the conventional magnetic recording reproducing apparatus.
Figure 25:
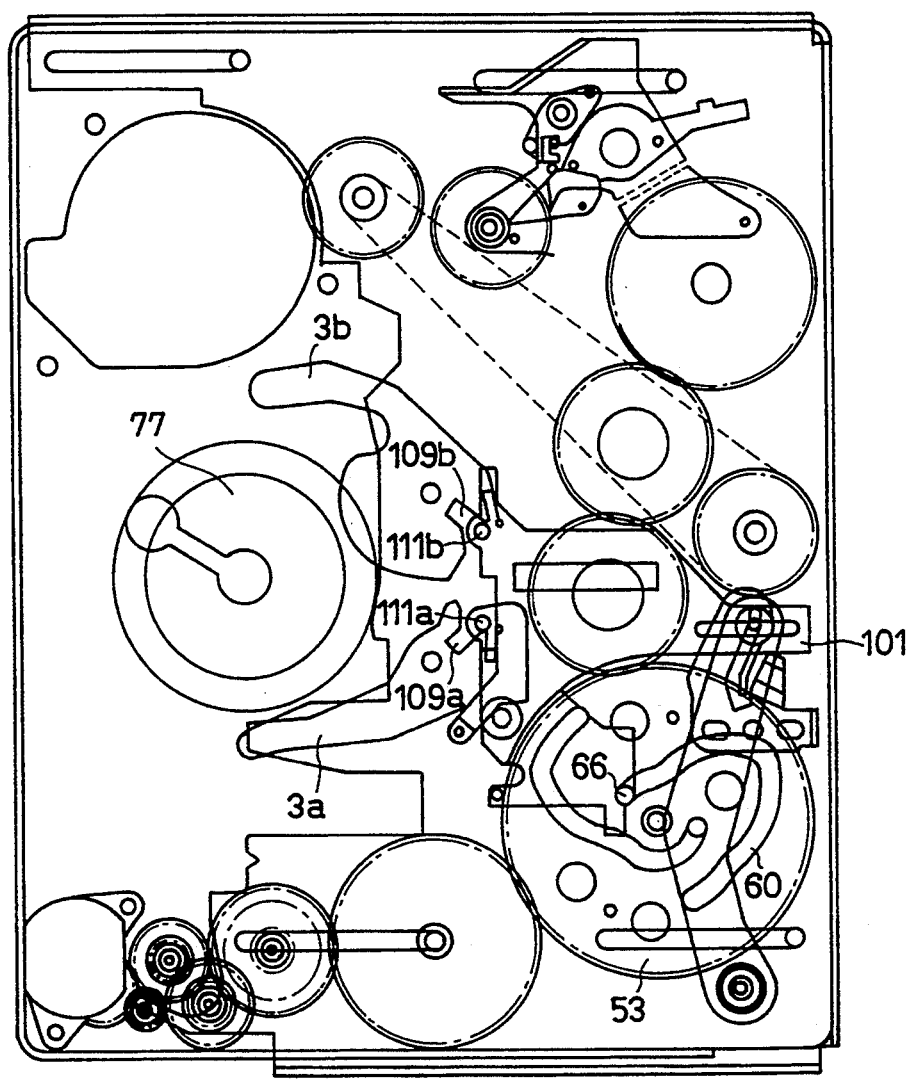
FIG. 25 is a plan view for explaining the operation of the loading arm provided in a conventional magnetic recording reproducing apparatus.

FIG. 19 is a plan view of the third linking arm 133 which can generate biasing force, and FIG. 20 is a side view of the third linking arm 133.

If the third linking arm 133 is adapted to be shrinked at the completion of loading, the guide base depresses the catcher pin by the reaction, so that the guide base can be surely positioned.

As described above, in the present invention, rotation of the tape taking out member is carried out by the sliding force of the second chassis moving relative to the first chassis. Therefore, it becomes unnecessary to slide the loading lever to rotate the tape taking up member, and the structure of the magnetic recording apparatus can be made simple.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A magnetic recording reproducing apparatus for recording information onto and reproducing information from a magnetic tape contained in a cassette removably inserted in the apparatus, comprising:
    a first chassis having a rotary head drum;
    a second chassis movable relative to said first chassis between a cassette removal position and a cassette recording/reproducing position;
    a tape taking up arm rotatably attached to said second chassis; and
    a tape taking up lever fixed to said first chassis for contacting said tape taking up arm during cassette loading movement of said second chassis and linked to a guide base having a guide member for taking up the magnetic tape; wherein said tape taking up arm and said tape taking up lever are arranged on and operatively connected to said second chassis and said first chassis, respectively, such that movement of said second chassis brings said tape taking up arm into contact with said tape taking up lever and rotates said tape taking up arm as said second chassis moves to take up and wind said magnetic tape around said rotary head drum.

2. The magnetic recording reproducing apparatus according to claim 1, further comprising:
    a first guide rail provided on said first chassis; and
    a second guide rail provided on said second chassis; wherein
    said second guide rail contacts said first guide rail when said second chassis moves in a direction for loading the cassette into the magnetic recording reproducing apparatus, and
    wherein movement of said second chassis rotates said tape taking up arm and causes said guide base to slide on said first and the second guide rails so that said guide member takes up said magnetic tape.

3. The magnetic recording reproducing apparatus according to claim 2, further comprising:
    means for biasing said second guide rail in the cassette loading direction, wherein
    said second guide rail is movably attached to said second chassis,
    and during loading of the cassette, said second guide rail connects with said first guide rail and said guide base moves from said second guide rail to said first guide rail.

4. The magnetic recording reproducing apparatus according to claim 3, further comprising:
    separation preventing means for preventing said second guide rail from separating from said first guide rail before said guide base moves from said first guide rail to said second guide rail when the cassette is unloaded.

5. The magnetic recording reproducing apparatus according to claim 4, wherein said separation preventing means includes:
    catching means provided at said second guide rail for preventing separation of said second guide rail from said first guide rail by catching said first guide rail, and
    means for enabling separation of said second guide rail from said first guide rail by releasing said catching means from said first guide rail when said guide base has moved from said first guide rail to said second guide rail.

6. The magnetic recording reproducing apparatus according to claim 4, wherein said separation preventing means is movably connected with said tape taking up arm.

7. A magnetic recording reproducing apparatus according to claim 6, wherein said separation preventing means includes:
    rotating means connected to said second guide rail which rotates when said second guide rail moves in a loading or unloading operation, and
    abutting means provided on said tape taking up arm for abutting with said rotating means, and wherein at the same time of unloading, said abutting means suppresses rotation of said rotating means to prevent separation of said second guide rail from said first guide rail until said guide base moves from said first guide rail to said second guide rail.

8. The magnetic recording reproducing apparatus according to claim 3, further comprising:
    second chassis movement control means for stopping movement of said second chassis when said second guide rail is separated from said first guide rail while said guide base is positioned on said first guide rail.

9. The magnetic recording reproducing apparatus according to claim 8, wherein separation of said second guide rail from said first guide rail is determined according to an electric signal from a photointerrupter, and further comprising:
    a mode switch that detects when said guide base moves from said first guide rail to said second guide rail to deactivate said photointerrupter whereby said second guide rail can be separated from said first guide rail.

10. The magnetic recording reproducing apparatus according to claim 9, wherein said photointerrupter is attached to said first chassis and a reflecting member for reflecting light from said photointerrupter is provided on said second guide rail.

11. The magnetic recording reproducing apparatus according to claim 2, further comprising:
    positioning means for stopping movement of said guide base when the cassette is loaded in the magnetic recording and reproducing apparatus, wherein said guide base is biased against said positioning means.

12. The magnetic recording reproducing apparatus according to claim 11, wherein
    said biasing is generated by elastic deformation of said tape taking up lever.

13. The magnetic recording reproducing apparatus according to claim 11, wherein said tape taking up arm is linked to said guide base with a linking arm interposed therebetween and said biasing force is generated by elastic deformation of said linking arm.

14. The magnetic recording reproducing apparatus according to claim 1, wherein said tape taking up arm contacts said tape taking up lever by fitting a pin provided on said tape taking up lever in a depressed portion formed in said tape taking up arm, and wherein moving force of said second chassis is transmitted through said pin to said tape taking up arm to rotate said tape taking up arm.

15. The magnetic recording reproducing apparatus according to claim 1, wherein said tape taking up arm contacts said tape taking up lever by engaging an external gear associated with said tape taking up and with a rack provided at said tape taking up lever, and wherein moving force of said second chassis is transmitted through said rack to said external gear to rotate said tape taking up arm.

* * * * *